(12) United States Patent
Chamberlain

(10) Patent No.: US 7,121,455 B2
(45) Date of Patent: Oct. 17, 2006

(54) SYSTEMS AND METHODS FOR ELECTRONIC POSTMARKING INCLUDING ANCILLARY DATA

(75) Inventor: Charles R. Chamberlain, Arlington, VA (US)

(73) Assignee: United States Postal Service, Washington, DC (US)

( * ) Notice: Subject to any disclaimer, the term of this patent is extended or adjusted under 35 U.S.C. 154(b) by 35 days.

(21) Appl. No.: 10/474,723

(22) PCT Filed: Apr. 12, 2002

(86) PCT No.: PCT/US02/11381

§ 371 (c)(1),
(2), (4) Date: Oct. 14, 2003

(87) PCT Pub. No.: WO02/084923

PCT Pub. Date: Oct. 24, 2002

(65) Prior Publication Data

US 2004/0117684 A1    Jun. 17, 2004

Related U.S. Application Data

(60) Provisional application No. 60/283,157, filed on Apr. 12, 2001.

(51) Int. Cl.
*G06F 17/00*    (2006.01)

(52) U.S. Cl. ............ 235/375; 235/380; 235/382; 705/75; 379/93.24; 713/401

(58) Field of Classification Search ............ 235/375, 235/380; 705/75; 379/93.24; 713/401
See application file for complete search history.

(56) References Cited

U.S. PATENT DOCUMENTS

| 5,629,982 | A | 5/1997 | Micah |
| 5,796,841 | A | 8/1998 | Cordery et al. |
| 6,009,417 | A | 12/1999 | Brookner et al. |
| 6,018,774 | A | 1/2000 | Mayle et al. |
| 6,199,052 | B1 | 3/2001 | Mitty et al. |
| 6,463,354 | B1 * | 10/2002 | Pintsov .................... 700/227 |

\* cited by examiner

*Primary Examiner*—Seung H Lee
(74) *Attorney, Agent, or Firm*—Finnegan, Henderson, Farabow, Garrett & Dunner, L.L.P.

(57) ABSTRACT

An embodiment of the invention provides a method for performing electronic postmarking of data, including ancillary data is provided. The method includes receiving data from a sender. The method further includes selecting ancillary data. The method further includes generating an electronic postmark including the ancillary data. The method further includes forwarding the data with the electronic postmark including the ancillary data to a receiver.

10 Claims, 6 Drawing Sheets

SYSTEMS AND METHODS FOR ELECTRONIC POSTMARKING INCLUDING ANCILLARY DATA

RELATED APPLICATIONS

This application claims the benefit of a provisional application entitled "Systems and Methods for Electronic Postmarking Including Ancillary Data," filed Apr. 12, 2001 and assigned Ser. No. 60/283,157. The contents of the above application is relied upon and expressly incorporated herein by reference.

BACKGROUND

1. Technical Field

The present invention relates generally to systems and methods for electronic postmarking. More particularly, this invention relates to systems and methods for electronically postmarking including ancillary data 2. Related Art The use of electronic networks to convey information among networked users has undergone an enormous amount of growth in recent years. The ability to transfer data using computer applications, such as, for example, electronic mail ("e-mail") and file transfer protocol ("CFTP") programs, has become increasingly important in personal, and especially, business communications. Electronic communication services have become invaluable to individual and business concerns.

E-mail is a well-known means of communication for individuals and businesses with access to computers and Internet connections. When a user establishes an account with an e-mail service provider, e.g., America Online™ or Hotmail™, the user is assigned a unique e-mail address, e.g., someone@inter.net. Another individual can send a message to the user by entering the user's e-mail address along with the message and sending it via the Internet. E-mail can provide almost instant message delivery among individuals and businesses over vast distances for very little or no cost.

Despite the advantages of e-mail, there are drawbacks. E-mail messages are insecure, and can be intercepted en route by unknown third parties. Individuals and businesses that communicate electronically need to know that they can rely on the address to correctly identity the sender and/or recipient.

FTP allows a user to transfer files between two computers, generally connected via a network. If a system has FTP and is connected to a network, a user can access files available on connected computer systems. FTP allows for the easy transfer of large numbers of files, for instant access to files, and file sharing by many individuals over vast distances.

Despite the advantages of FTP, there are drawbacks. It may be difficult to keep files to be transferred secure and to control the flow of the electronic files. Individuals and businesses that use FTP for file sharing need to know that they can correctly identify the requestor and source of the file.

In addition to e-mail and FTP programs, other types of data transfer are employed in business communications. For example, buying and selling goods online, electronic funds transfer, online advertising, and accessing business information resources, is known as electronic commerce (E-commerce). E-commerce can improve the efficiency of current business processes and provide opportunities to widen existing customer bases. As the number of Internet users continues to expand, e-commerce has the potential to be the source of an extraordinary amount of revenue growth. In order to realize this potential, a variety of communication services and features will be required for e-commerce, which traditionally have been available in physical communication channels.

The United States Postal Service (USPS), an independent establishment of the executive branch of the U.S. Government, provides many features through a variety of document and package delivery services. The USPS is widely recognized as a secure and reliable means for sending and receiving packages and mail used for both personal and business transactions. Packages and mail sent via the USPS are physically time-stamped with an official postmark, which provides the recipient with proof of the time the item was sent. Additionally, once a package or mail item is placed with the USPS, the item is no longer in the sender's control, and thus cannot be recalled. Furthermore, packages and mail sent through the USPS are protected from third party tampering by Federal laws.

In contrast, electronic communication services and e-commerce services currently do not provide these features. As described in U.S. patent application Ser. No. 09/675,677, filed Sep. 29, 2000, entitled "Systems and Methods for Authenticating an Electronic Message," the disclosure of which is expressly incorporated herein by reference, an "electronic postmark," or EPM, provides content and temporal integrity and identification authenticity for data that is transferred over a network. Such EPMs have traditionally been used to authenticate the identity of the sender of a particular message or to authenticate the time/date at which the message was created.

In addition to authenticating the electronic message itself, it would be advantageous to authenticate included ancillary data, such as an attached image, sent along with an electronic message. In light of the foregoing, it is desirable to provide systems and methods for electronic communication services and e-commerce services providing for authentication of electronic transactions by use of an electronic postmark including ancillary data.

SUMMARY OF THE INVENTION

In accordance with the purpose of the present invention, as embodied and broadly described herein, the invention provides systems and methods for performing electronic postmarking of data, including ancillary data.

In one embodiment consistent with the present invention, a method for performing electronic postmarking of data, including ancillary data is provided. The method includes receiving data from a sender. The method further includes selecting ancillary data. The method further includes generating an electronic postmark including the ancillary data. The method further includes forwarding the data with the electronic postmark to a receiver.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made to the present embodiments consistent with the invention, examples of which are illustrated in the accompanying drawings. Wherever possible, the same reference numbers will be used throughout the drawings to refer to the same or like parts.

The described system and methods relate to electronic communication services and e-commerce services providing for authentication of electronic transactions by use of an electronic postmark including ancillary data.

Exemplary System Architecture

Basic Architecture

Figure 1A:
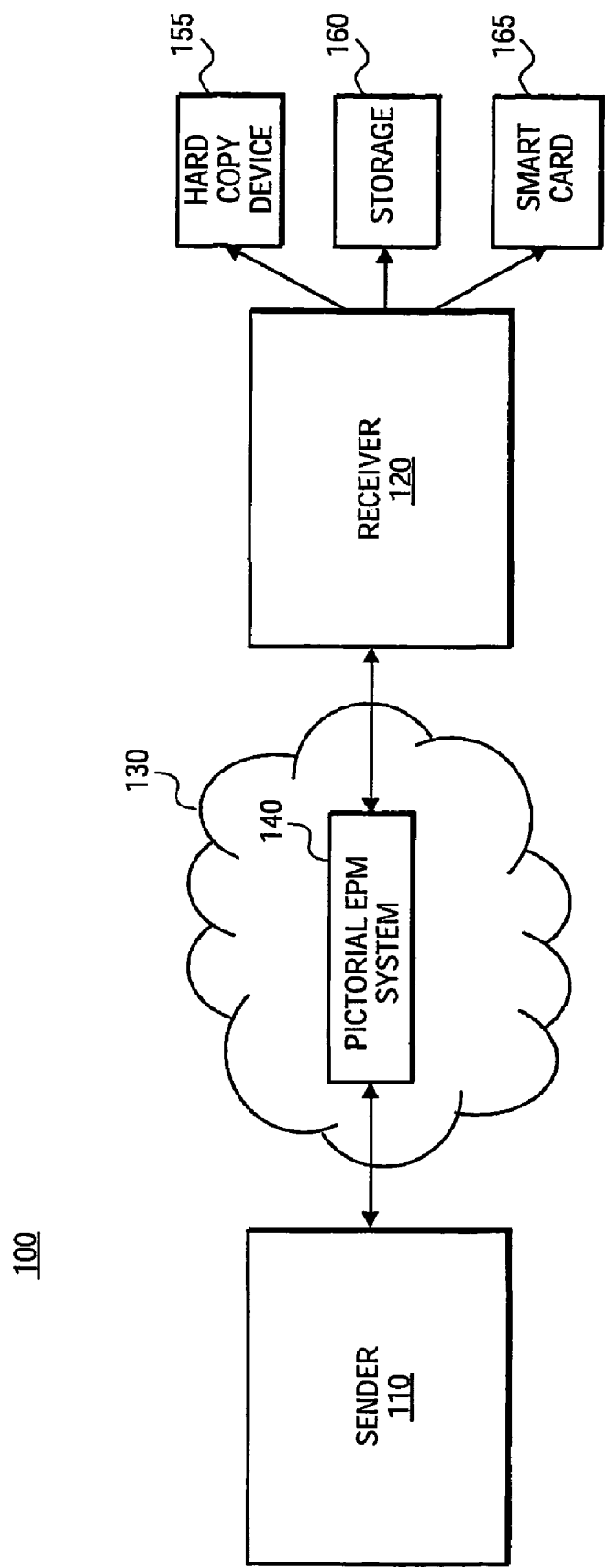
FIG. 1A shows a block diagram of an exemplary system in which methods and system consistent with the invention may be implemented.

FIG. 1A is block diagram of an exemplary system 100 in which methods and system consistent with the invention may be implemented. System 100 includes a sender 110 and a receiver 120 connected by a network 130. Between sender 110 and receiver 120 is a pictorial EPM system 140.

Network 130 can be TCP/IP based, wireless, or any kind of digital network connection, such as the Internet, a wide area network (WAN), a local area network (LAN) or a proprietary network. System architecture 100 is suitable for use with the Java™, Python™, C++, SQL™ programming languages, and other like programming languages.

Sender 110, receiver 120, and pictorial EPM system 140 may all be individual computers or systems running together on one computer. They may be personal computers, such as Apple PowerMacintoshes or Pentium-based personal computers running a version of the Windows operating system, workstation, or other appropriate types of computers.

In system 100, sender 110 communicates with receiver 120 through network 130. The communication between the sender 110 and receiver 120 can be conducted through a web-based environment in which the sender 110 and receiver 120 communications are transmitted via HTTP protocol.

Sending user may use sender 110, which may be a personal computer to send a message (not shown) via network 130 to receiving user who is using receiver 120, which also may be a personal computer. The message, which may be any type of electronic transaction, passes through pictorial EPM system 140 and pictorial EPM system 140 the message receives an electronic postmark which includes ancillary data. The ancillary data may be and attached image.

Receiver 120 could be connected to a variety of devices for storing and displaying the image. Such devices may include a hard copy device 155, a digital storage device 160, and/or a smart card 165. Receiving user at receiver 120 thus has an option of storing in hardcopy device 155, for example, a printer or fax machine, or in smart card 165 so that the receiving user can carry that image around, use it, or show it somewhere else. Another option is using digital storage device 160.

Figure 1B:
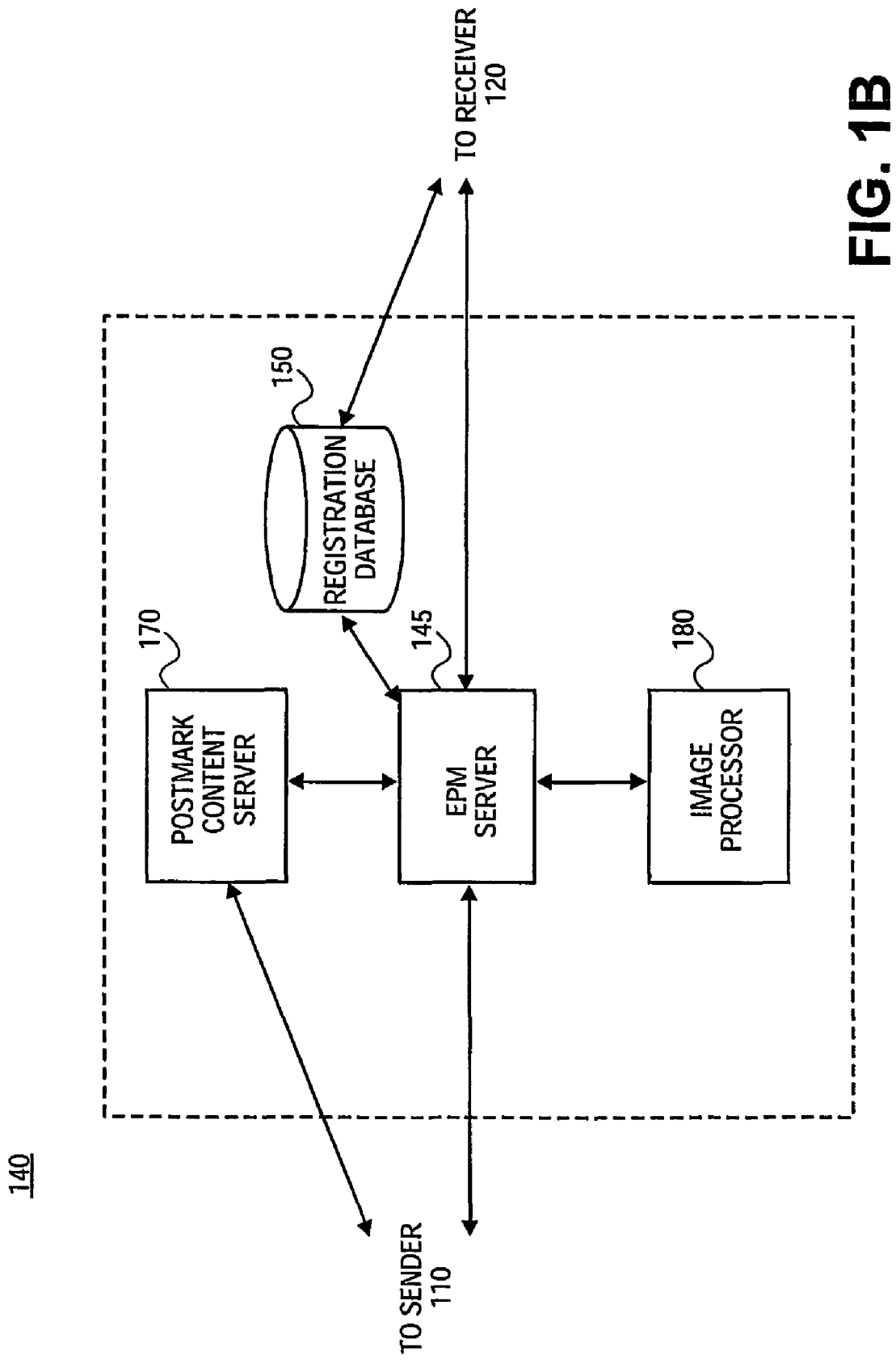
FIG. 1B shows a detailed block diagram of a pictorial EPM system of FIG. 1A in which methods and system consistent with the invention may be implemented.

FIG. 1B is block diagram of a pictorial EPM system 140. Pictorial EPM system 140 includes an EPM server 145, a postmark content server 170, an image processor 180 and a registration database 150. EPM server 145 receives a message from sender 110. EPM server attaches a postmark to the message and then forwards the message with the postmark to receiver 120. One example of EPM server 145 is described in U.S. patent application Ser. No. 09/675,677, filed Sep. 29, 2000, entitled "Systems and Methods for Authenticating an Electronic Message." EPM server 145 generates the electronic postmark that is attached to the electronic transactions. A postmark may include a hash of the message, a time and date stamp and a digital signature for authenticating the message.

For pictorial electronic postmarking, EPM server 145 is connected to image processor 180 and postmark content server 170. Postmark content server 170 can generate images to create a pictorial EPM, similar to a stamp. Postmark content server 170 is also connected to sender 110. Sending user using sender 110 can register with postmark content server 170 and select particular content, such as a graphic image, that sending user desires to be to messages from sender 110, similar to picking a stamp at the post office. If sender 110 does not select a preference for a specific graphic image, content server 170 will select the graphic image to be used. The content can be similar to currently existing postage stamps.

The graphic image selected is an electronic image, such as a .tiff, .gif, .jpeg, or other type of electronic file. Code embedded in the graphic image will allow for a hyperlinks to content on the Internet. Thus when a receiving user receives the image on receiver 120, the receiving user can "click" on the image and be taken via a web browser, such as Netscape Navigator or Microsoft Internet Explorer, to a web page displaying information about the image. For example, a pictorial EPM can include a graphic image of an Ansil Adams photograph of Yosemite. When the receiving user receives the pictorial EPM they may "click" on the image of Yosemite and be taken via a hyperlink to more information about the national park, Yosemite, more information about Ansil Adams, or more information about California In another embodiment, the receiving user may pass a "cursor" over the image and a pop-up dialog box may appear on the screen containing more information about the image. The content of the graphic image in the pictorial EPM can be an image tied to daily changing news. One example of this is an image from the headline of USA Today. For example, on a Monday, a sports topic image will be used; Tuesday, a current events image; Wednesday, a science image; Thursday, a human-interest image. The image would not just be a graphic, but could also provide a link to more information, such as the USA Today text article.

The EPM server may also receive an image from sender 110, and use image processor 180 to attach the image to the EPM. For example the sending user may capture a real time image comprising a self-portrait to add to and authenticate the electronic transfer. Sender 110 may have a corporate identity and wish for all electronic transactions to have a corporate logo or corporate information attached to the EPM.

As shown in FIG. 1B, EPM system 140 may include a registration database 150, connected to RPM server 145 and receiver 120. Registration database 150 may be updated by EPM server 145 to include information about a pictorial EPM that was sent to a particular receiver 120. This information may indicate that the receiver 120 has or will be receiving the limited edition sports images with the electronic transaction and will register the receiver 120 as a legal owner of, for example, the sports image of Babe Ruth—serial number 123456. That information would then reside in the registration database 150. However, if the electronic transaction is not registered by EPM server 145, and if receiver 120 wishes to enhance the pictorial EPM received, receiver 120 may communicate with the registration database and register the pictorial EPM. This registration can be used for future trading or selling of the pictorial EPM.

Exemplary Computer System

Figure 2:
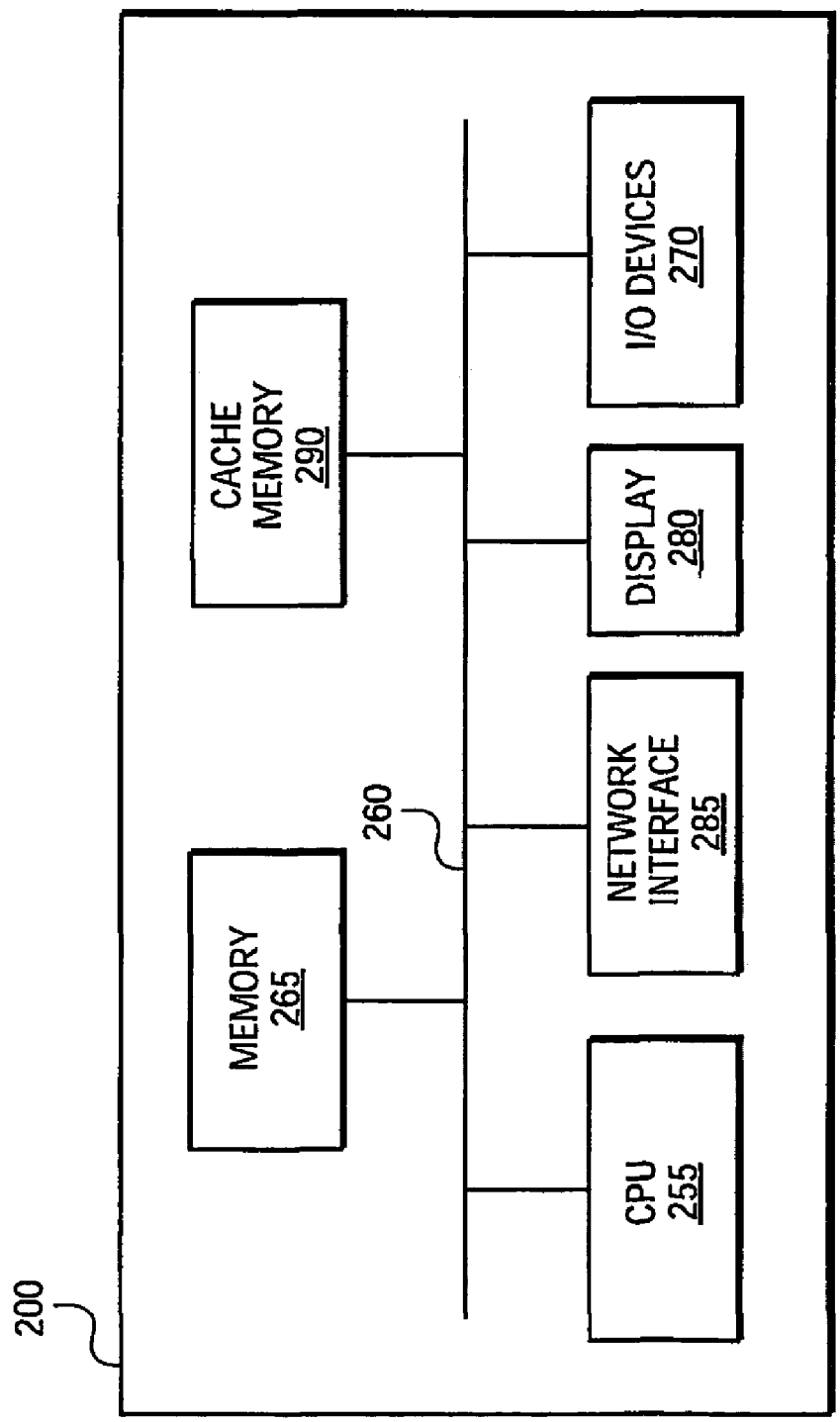
FIG. 2 shows an internal block diagram of an exemplary computer system in which methods and system consistent with the invention may be implemented.

FIG. 2 is an internal block diagram of an exemplary computer system 200 in which methods and system consistent with the invention may be implemented. Computer system 200 may represent the internal components of sender 110, receiver 120, pictorial EPM system 140, or registration database 150 in FIGS. 1A and 1B.

Computer system 200 includes several components all interconnected via a system bus 260. Bus 260 may be, for example, a bidirectional system bus that connects the components of computer system 200. For example, bus 260 may contain thirty-two address lines for addressing a memory 265 and thirty-two bit data lines for transferring data among the components. Alternatively, multiplex data/address lines may be used instead of separate data and address lines. Computer system 200 may communicate with other computing systems on network 160 via network I/O 285, examples of which include Ethernet or dial-up telephone connections.

Computer system 200 contains a central processing unit (CPU) 255 connected to a memory 265. CPU 255 may be a microprocessor such as the Pentium® family microprocessors manufactured by Intel Corporation. However, any other suitable microprocessor, micro-, mini-, or mainframe computer may be used. Memory 265 may include a random access memory (RAM), a read-only memory (ROM), a video memory, or mass storage. Mass storage 290 may include both fixed and removable media (e.g., magnetic, optical, or magnetic optical storage systems or other available mass storage technology).

Memory 265 may contain a program, an application programming interface (API), and other instructions for performing the methods consistent with the invention. Media Application 170 may be implemented as a software program in memory 265 executed by CPU 255. In one embodiment, media application 170 is a computer pram suitable for the C++ programming language.

Computer system 200 may also receive input via input/output (I/O) devices 270, which may include a keyboard, pointing device, or other like input devices. Computer system 200 may also present information and interfaces via display 280.

Figure 3:
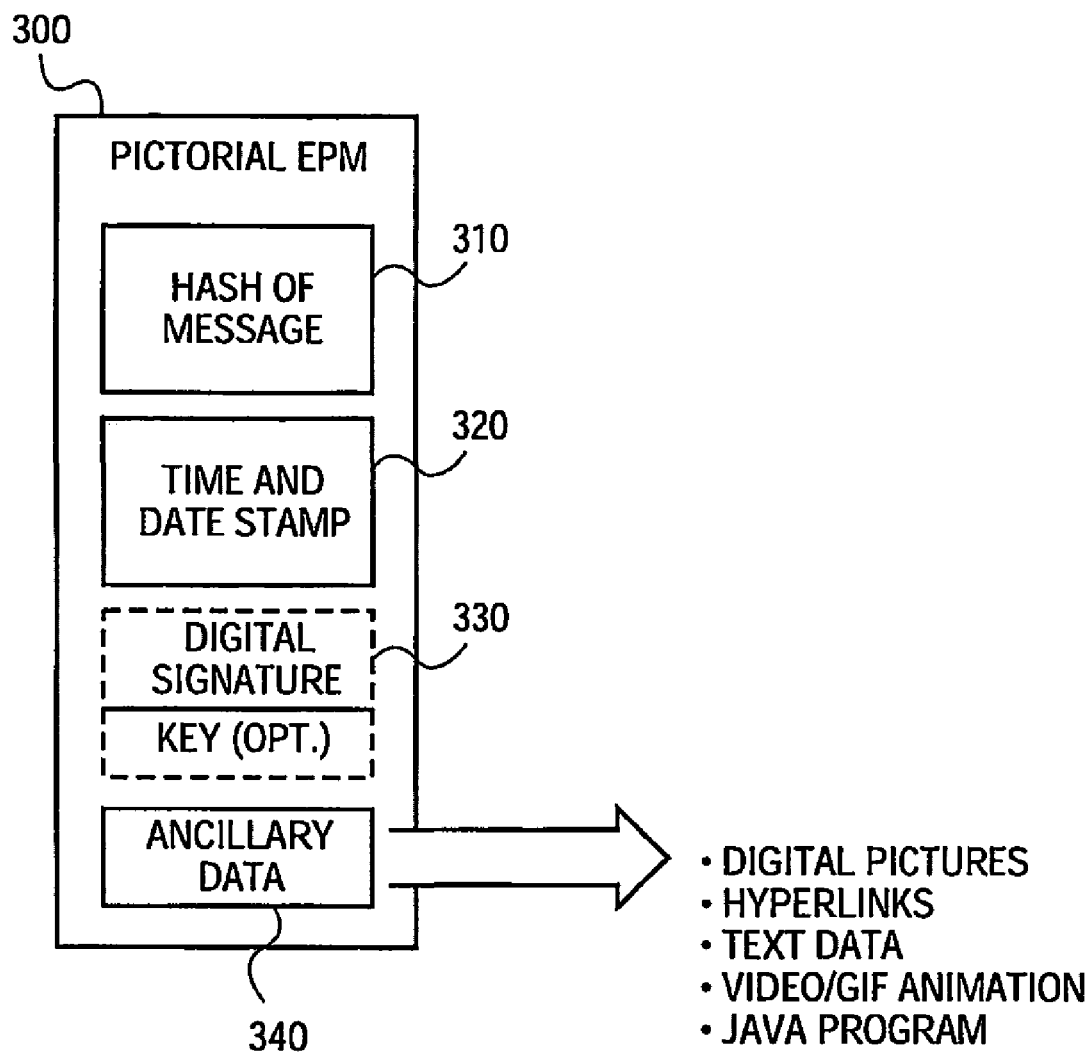
FIG. 3 shows an exemplary block diagram of a pictorial EPM consistent with the invention.

FIG. 3 is a block diagram of a pictorial EPM 300 generated by EPM server 145. Pictorial EPM 300 may include hash 310 of a message received from sender 110, a time and date stamp 320, an optional digital signature 330, and ancillary data 340. Hash 310 of a message authenticates the content of the message. The message may be an email, a document, or any type of electronic data transfer. Time and date stamp 320 may be added by the USPS at EPM server 145. Digital signature 330 can be the signing of hash 310 using a postal signing key and optionally also including a public or private key in the postmark. Ancillary data 340 may be a digital picture, for example, a picture from a vacation or a sporting event. The ancillary data may also be or include a hyperlink, text data, a video or a GIF animation, or a computer program.

Figure 4:
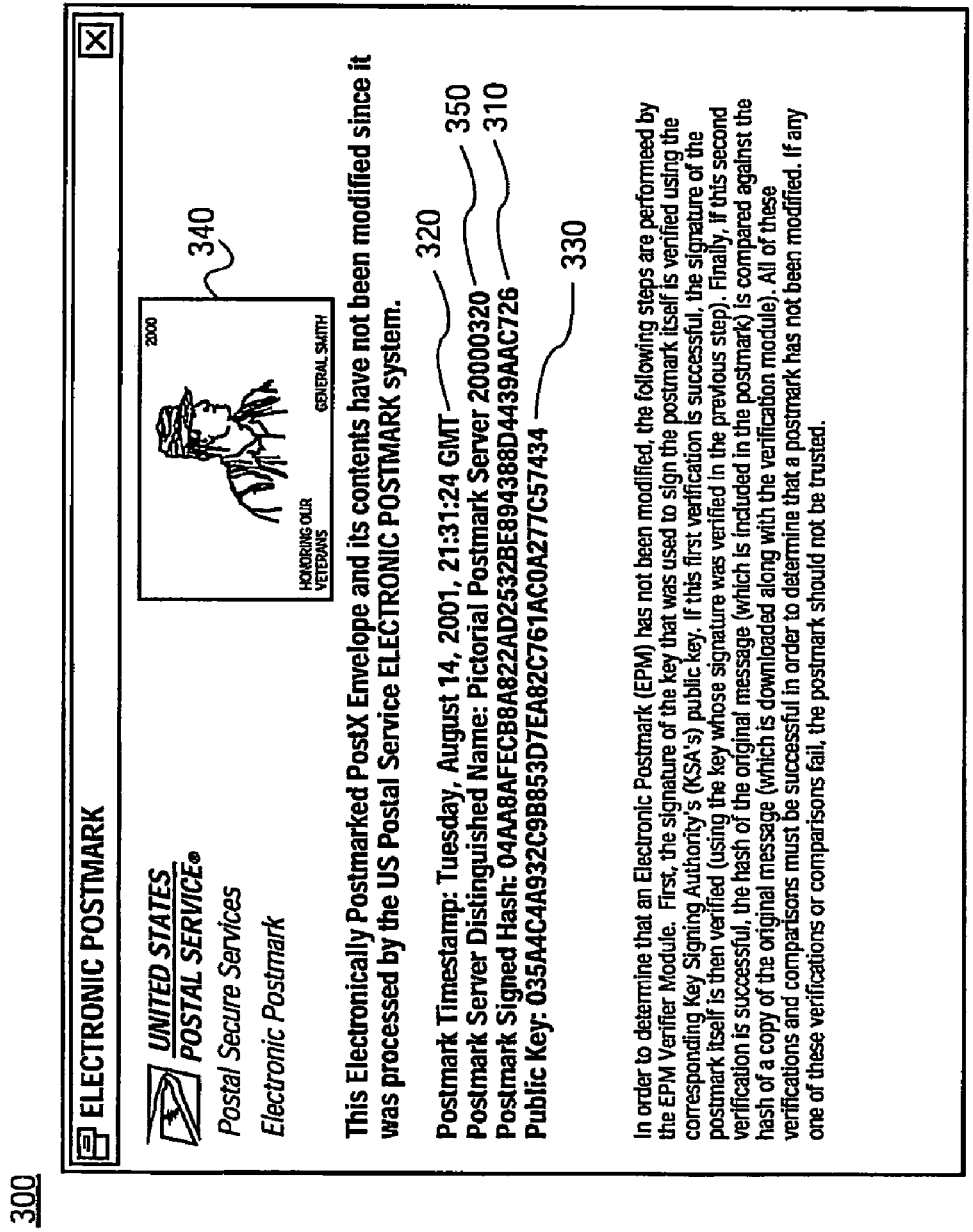
FIG. 4 shows an illustration of an exemplary pictorial EPM consistent with the invention.

FIG. 4 is an illustration of an exemplary pictorial EPM 300 as viewed by receiver 120 or recipient of the pictorial EPM. Pictorial EPM 300 could, of course, be much simpler in appearance than this representation. EPM 300 authenticates the time and date the message was sent, with time and date stamp 320. EPM server 145 can be identified at 350 along with hash 310 and digital signature 330. Additionally, EPM 300 authenticates the time and date that the ancillary data was sent, as well as authenticating the fact that the ancillary data was sent with a particular message including ancillary data, such as an image 340. Included in EPM 300 is information about how to verify the authenticity of the postmark.

Figure 5:
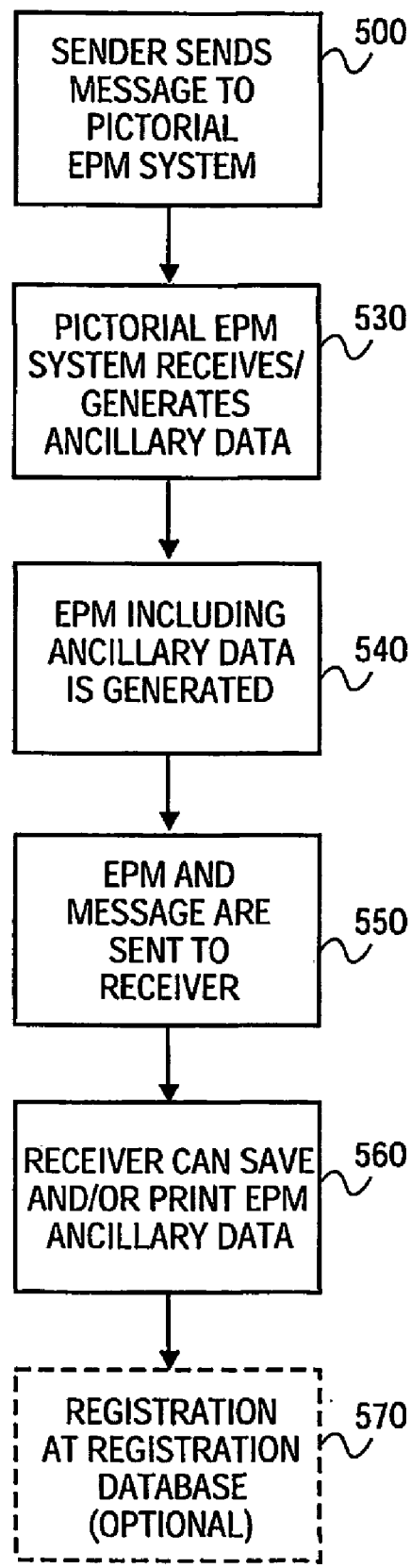
FIG. 5 shows a flowchart of an exemplary method for performing electronic postmarking of data, including ancillary data.

FIG. 5 illustrates the pictorial EPM process. First, sender 110 sends a message to pictorial EPM system 140 (step 500). Pictorial EPM system 140 receives or generates ancillary data (step 530). Sender 110 has the option of sending ancillary data for the pictorial EPM, of requesting specific ancillary data from postmark content server 170, or permitting EPM server 145 to generate the ancillary data. EPM 300, including the ancillary data, is generated (step 540). The message, including EPM 300, is sent to receiver 120 (step 550). Receiver 120 can save and/or print the message (step 560). Optionally the EPM ancillary data can be registered in a registration database (step 570). Registration serves as a fail-safe procedure for authenticating whether or not ancillary data associated with an EPM is an original pictorial EPM.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing an electronic postmark for message data, the postmark including ancillary data, the method comprising:
   receiving message data from a sending user;
   receiving a selection of ancillary data from the sending user;
   generating an electronic postmark including the ancillary data;
   forwarding the message data with the electronic postmark to a receiving user;
   registering use of the ancillary data in the electronic postmark in a database; and
   using the database to authenticate the ancillary data.

2. The method of claim 1, wherein receiving a selection of ancillary data includes generating the ancillary data based on sending user preferences.

3. The method of claim 1, wherein generating the electronic postmark includes forwarding the message data and the ancillary data to an electronic postmark server.

4. The method of claim 1, wherein generating an electronic postmark further comprises:
   generating a hash of the message data;
   generating a time and date stamp;
   generating a digital signature; and
   attaching the ancillary data.

5. The method of claim 1, wherein the ancillary data is one of an image, a hypertext link, a digital video, or a computer program.

6. The method of claim 1, wherein receiving a selection of ancillary data includes generating the ancillary data based on sending user preferences.

7. A system for providing an electronic postmark for message data, the postmark including ancillary data, the method comprising:
- means for receiving message data from a sending user;
- means for receiving a selection of ancillary data from the sending user;
- means for generating an electronic postmark including the ancillary data;
- means for forwarding the message data with the electronic postmark to a receiving user;
- means for registering use of the ancillary data in the electronic postmark in a database; and
- using the database to authenticate the ancillary data.

8. The system of claim 7, wherein the means for generating an electronic postmark includes means for forwarding the message data and the ancillary data to an electronic postmark server.

9. The system of claim 7, wherein means for generating the electronic postmark further comprises:
- means for generating a hash of the message data;
- means for generating a time and data stamp;
- means for generating a digital signature; and
- means for attaching the ancillary data.

10. The system of claim 7, wherein the ancillary data is one of an image, a hypertext link, a digital video, or a computer program.

* * * * *

UNITED STATES PATENT AND TRADEMARK OFFICE
CERTIFICATE OF CORRECTION

| | | |
|---|---|---|
| PATENT NO. | : 7,121,455 B2 | Page 1 of 1 |
| APPLICATION NO. | : 10/474723 | |
| DATED | : October 17, 2006 | |
| INVENTOR(S) | : Charles R. Chamberlain | |

It is certified that error appears in the above-identified patent and that said Letters Patent is hereby corrected as shown below:

Column 7, line 4, "The method of claim 1" should read --The system of claim 7--.

Signed and Sealed this

Thirteenth Day of February, 2007

JON W. DUDAS
*Director of the United States Patent and Trademark Office*